United States Patent
Hosoda et al.

(10) Patent No.: US 10,597,474 B2
(45) Date of Patent: Mar. 24, 2020

(54) NON-FLUORINATED POLYMER, WATER REPELLENT AGENT COMPOSITION, WATER-REPELLENT FIBER PRODUCT, AND METHOD FOR PRODUCING WATER-REPELLENT FIBER PRODUCT

(71) Applicant: NICCA CHEMICAL CO., LTD., Fukui-shi, Fukui (JP)

(72) Inventors: Masaaki Hosoda, Fukui (JP); Makoto Nishikawa, Daegu (KR); Min-Si Jung, Daegu (KR)

(73) Assignees: NICCA CHEMICAL CO., LTD., Fukui-Shi, Fukui (JP); NICCA KOREA CO., LTD., Seoul (KR)

( * ) Notice: Subject to any disclaimer, the term of this patent is extended or adjusted under 35 U.S.C. 154(b) by 111 days.

(21) Appl. No.: 15/745,740

(22) PCT Filed: Jul. 13, 2016

(86) PCT No.: PCT/JP2016/070727
§ 371 (c)(1),
(2) Date: Jan. 18, 2018

(87) PCT Pub. No.: WO2017/014131
PCT Pub. Date: Jan. 26, 2017

(65) Prior Publication Data
US 2018/0215848 A1    Aug. 2, 2018

(30) Foreign Application Priority Data

Jul. 23, 2015  (JP) ................ 2015-145983

(51) Int. Cl.
| | | |
|---|---|---|
| C08F 220/18 | (2006.01) | |
| C08F 214/06 | (2006.01) | |
| D06M 15/263 | (2006.01) | |
| C09D 127/06 | (2006.01) | |
| C08F 220/10 | (2006.01) | |
| C09D 133/06 | (2006.01) | |
| C09K 3/18 | (2006.01) | |
| D06M 15/248 | (2006.01) | |
| D06M 101/32 | (2006.01) | |
| D06M 101/34 | (2006.01) | |

(52) U.S. Cl.
CPC .......... *C08F 220/18* (2013.01); *C08F 214/06* (2013.01); *C08F 220/10* (2013.01); *C09D 127/06* (2013.01); *C09K 3/18* (2013.01); *D06M 15/248* (2013.01); *D06M 15/263* (2013.01); *C08F 2220/1883* (2013.01); *C08F 2220/1891* (2013.01); *C09D 133/06* (2013.01); *D06M 2101/32* (2013.01); *D06M 2101/34* (2013.01); *D06M 2200/12* (2013.01)

(58) Field of Classification Search
CPC .... C08F 220/18; C08F 220/10; C08F 214/06; C08F 2220/1883; C08F 2220/1891; C09K 3/18; D06M 15/263; D06M 15/248; D06M 2101/32; D06M 2101/34; D06M 2200/12; C09D 127/06; C09D 133/06
USPC ...................................... 526/329.4
See application file for complete search history.

(56) References Cited

U.S. PATENT DOCUMENTS

| | | | |
|---|---|---|---|
| 8,969,492 B2 * | 3/2015 | Fuchs ............. | C08F 220/18 526/89 |
| 2012/0015575 A1 * | 1/2012 | Fuchs ............. | C08F 220/18 442/79 |

FOREIGN PATENT DOCUMENTS

| | | |
|---|---|---|
| EP | 2233633 | 9/2010 |
| JP | 2012-522062 A | 9/2002 |
| JP | 2006-328624 A | 12/2006 |
| JP | 2010-222502 A | 10/2010 |
| JP | 2015-040365 A | 3/2015 |
| JP | 2015-120894 A | 7/2015 |
| JP | 2015120894 A * | 7/2015 ............ C08F 220/18 |
| WO | WO 2010/115496 A1 | 10/2010 |
| WO | WO 2015/111668 | 7/2015 |

OTHER PUBLICATIONS

"Details of Super Water Repellent Finishing and Finishing Agents, and New Trend of Moisture Permeable Waterproof Materials," *Osaka Chemical Marketing Center, Inc.*, 3(1): p. 7-9 (1996).
International Bureau, International Search Report in International Application No. PCT/JP2016/070727, dated Oct. 4, 2016.
(Continued)

*Primary Examiner* — Michael Bernshteyn
(74) *Attorney, Agent, or Firm* — Leydig Voit & Mayer, Ltd.

(57) ABSTRACT

The non-fluorinated polymer includes a constituent unit derived from a (meth)acrylic acid ester monomer (A) represented by the following General Formula (A-1); and at least one monomer (E) from between vinyl chloride and vinylidene chloride:

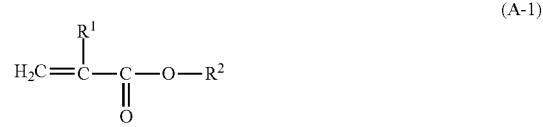

wherein in Formula (A-1), $R^1$ represents a hydrogen or a methyl group; and $R^2$ represents a monovalent hydrocarbon group having 12 or more carbon atoms which may have a substituent.

16 Claims, No Drawings

(56) References Cited

OTHER PUBLICATIONS

International Bureau, International Preliminary Report on Patentability in counterpart International Application No. PCT/JP2016/070727, dated Feb. 1, 2018.

Chinese Patent Office, Office Action in Chinese Patent Application No. 201680042812.X, dated Sep. 20, 2019.

Guixiang, "Surfactant Chemistry," *Beijing Institute of Technology Press*, 1$^{st}$ Ed., p. 423 (2009).

Yaqing, et al., "Higher Education Teaching Book Auxiliary Chemistry and Technology," *Chemical Industry Press*, 1$^{st}$ Ed., p. 46-48 (1997).

\* cited by examiner

NON-FLUORINATED POLYMER, WATER REPELLENT AGENT COMPOSITION, WATER-REPELLENT FIBER PRODUCT, AND METHOD FOR PRODUCING WATER-REPELLENT FIBER PRODUCT

CROSS-REFERENCE TO RELATED APPLICATIONS

This patent application is the U.S. National Stage of International Patent Application No. PCT/JP2016/070727, filed Jul. 13, 2016, which claims the benefit of Japanese Patent Application No. 2015-145983, filed Jul. 23, 2015, which are each incorporated by reference.

TECHNICAL FIELD

The present invention relates to a non-fluorinated polymer, a water repellent agent composition, a water-repellent textile product, and a method for producing a water-repellent textile product.

BACKGROUND ART

Fluorinated water repellent agents having fluorine-containing groups are conventionally known, and textile products imparted with water repellency on the surface, which are produced by treating textile products or the like with such fluorinated water repellent agents, are known. Such a fluorinated water repellent agent is generally produced by polymerizing or copolymerizing a monomer having a fluoroalkyl group.

Textile products that have been treated with fluorinated water repellent agents exhibit excellent water repellency; however, in order to manifest water repellency, it is necessary to arrange the orientation of fluoroalkyl groups. Therefore, after a fluorinated water repellent agent is attached to a textile product, the textile product must be heat-treated at a temperature of higher than 130° C. However, since a heat treatment at high temperature requires much energy, this poses a problem in the global movement of saving energy.

Furthermore, since monomers having fluoroalkyl groups are expensive, it is not satisfactory from the viewpoint of economic efficiency, and moreover, monomers having fluoroalkyl groups also have an environmental problem because the monomers have low degradability.

Meanwhile, in the field of water repellent processing of textile product, a water repellent agent that can provide excellent water repellency to a textile product even at a low concentration or a low heat treatment temperature is desired in view of the stabilization of product quality and cost reduction.

Thus, in recent years, research on non-fluorinated water repellent agents that do not contain fluorine is underway. For example, Non-Patent Literature 1 discloses a water repellent agent in which hydrocarbon compounds such as paraffin or waxes, a fatty acid metal salt, or an alkylurea is emulsified and dispersed.

Furthermore, Patent Literature 1 suggests a water repellent agent in which a particular non-fluorinated polymer is emulsified and dispersed, for the purpose of providing water repellency that is comparable to conventional fluorinated water repellent agents.

CITATION LIST

Non Patent Literature

Non-Patent Literature 1: "New trend of super water-repellent processing, whole aspect of processing agents, and moisture-permeable waterproof materials", published by Osaka Chemical Marketing Center, 1996, p. 7-9

Patent Literature

Patent Literature 1: Japanese Unexamined Patent Publication No. 2006-328624

SUMMARY OF INVENTION

Technical Problem

However, with regard to the non-fluorinated water repellent agent described in Non-Patent Literature 1, it is difficult to obtain a textile product having water repellency that is similar to that in the case of treating a textile product with a conventional fluorinated water repellent agent. Furthermore, those treated textile products tend to become hard, and thus, it cannot be said that the products are satisfactory in terms of texture.

In the case of the non-fluorinated water repellent agent described in Patent Literature 1, when a surfactant is incorporated in an amount in which a non-fluorinated polymer is sufficiently emulsified and dispersed in order to secure storage stability, the water repellency of the textile product thus obtainable tends to deteriorate, and it is difficult to promote a balance between storage stability and water repellency.

There are occasions in which a water repellent-treated textile product or the like are subjected to processing of coating a predetermined part of the textile product with a urethane resin, an acrylic resin or the like. The textile product in this case is required to have sufficient water repellency, while it is also required that the part being subjected to coating does not easily undergo peeling of the coating film. However, in a case in which a base material is treated with the non-fluorinated water repellent agent described in Non-Patent Literature 1 or Patent Literature 1 and then is coated with the above-mentioned resin, the coating film tends to be easily peeled off, and it is difficult to achieve a balance between water repellency and the peeling strength for the coating.

The present invention was achieved in view of such circumstances as described above, and it is an object of the invention to provide a non-fluorinated polymer that has excellent storage stability, can impart sufficient water repellency to a textile product or the like even in the case of not being heat-treated, and can produce a water-repellent textile product having excellent texture and excellent water repellency, while the product thus obtainable may have sufficient peeling strength with respect to a coating, and to provide a water repellent agent composition using the non-fluorinated polymer, a water-repellent textile product, and a method for producing a water-repellent textile product.

Solution to Problem

The present invention provides a non-fluorinated polymer containing a constituent unit derived from a (meth)acrylic acid ester monomer (A) represented by the following General Formula (A-1), and a constituent unit derived from at least one monomer (E) from between vinyl chloride and vinylidene chloride.

(A-1)

wherein in Formula (A-1), $R^1$ represents a hydrogen or a methyl group; and $R^2$ represents a monovalent hydrocarbon group having 12 or more carbon atoms which may have a substituent.

The above-mentioned non-fluorinated polymer may further contain a constituent unit derived from at least one reactive emulsifier (B) selected from among (B1) a compound represented by the following General Formula (I-1) and having a HLB of 7 to 18; (B2) a compound represented by the following General Formula (II-1) and having a HLB of 7 to 18; and (B3) a compound having a HLB of 7 to 18 and obtained by adding an alkylene oxide having 2 to 4 carbon atoms to an oil or fat having a hydroxyl group and a polymerizable unsaturated group:

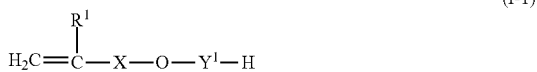

(I-1)

wherein in Formula (I-1), $R^3$ represents a hydrogen or a methyl group; X represents a linear or branched alkylene group having 1 to 6 carbon atoms; and $Y^1$ represents a divalent group including an alkyleneoxy group having 2 to 4 carbon atoms;

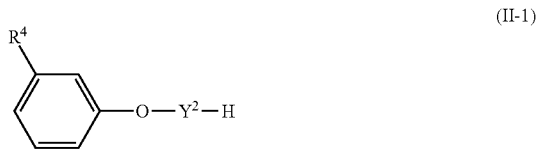

(II-1)

wherein in Formula (II-1), $R^4$ represents a monovalent unsaturated hydrocarbon group having 13 to 17 carbon atoms and having a polymerizable unsaturated group; and $Y^2$ represents a divalent group including an alkyleneoxy group having 2 to 4 carbon atoms.

The present invention also provides a non-fluorinated polymer formed by subjecting an emulsion or dispersion including the (meth)acrylic acid ester monomer (A) represented by General Formula (A-1) and at least one monomer (E) from between vinyl chloride and vinylidene chloride, to emulsion polymerization or dispersion polymerization.

The emulsion or the dispersion may further include at least one reactive emulsifier (B) selected from among (B1) a compound represented by General Formula (I-1) described above and having a HLB of 7 to 18; (B2) a compound represented by General Formula (II-1) described above and having a HLB of 7 to 18; and (B3) a compound having a HLB of 7 to 18 and obtained by adding an alkylene oxide having 2 to 4 carbon atoms to an oil or fat having a hydroxyl group and a polymerizable unsaturated group.

The (meth)acrylic acid ester monomer (A) may include an acrylic acid ester monomer (a1) and a methacrylic acid ester monomer (a2). The ratio (a1)/(a2) of the mass of the acrylic acid ester monomer (a1) and the mass of the methacrylic acid ester monomer (a2) included in the (meth)acrylic acid ester monomer (A) may be 30/70 to 90/10.

The present invention further provides a water repellent agent composition including the non-fluorinated polymer according to the present invention.

The present invention also provides a water-repellent textile product consisting of a textile product having the non-fluorinated polymer according to the present invention attached thereto.

The water-repellent textile product of the present invention can sufficiently maintain the texture and water repellency even in the case of being used outdoors for a long time period. Furthermore, the water-repellent textile product of the present invention can have sufficient peeling strength with respect to a coating when the water-repellent textile product is subjected to processing of coating a predetermined part of the textile product with a urethane resin, an acrylic resin or the like.

The present invention also provides a method for producing a water-repellent textile product, the method including a step of treating a textile product with a treatment liquid including the water repellent agent composition according to the present invention.

According to the method for producing a water-repellent textile product of the present invention, by using a water repellent agent composition including the non-fluorinated polymer according to the present invention, which has excellent storage stability, can impart sufficient water repellency to a textile product even in a case in which a heat treatment is not carried out, and can also have sufficient peeling strength with respect to a coating, a water-repellent textile product having excellent texture and water repellency can be produced stably. Furthermore, the method for producing a water-repellent textile product of the present invention can satisfactorily carry out a post-process of coating a predetermined part of the water-repellent textile product with a urethane resin, an acrylic resin or the like, if necessary. Furthermore, since the method for producing a water-repellent textile product of the present invention does not need a heat treatment at high temperature, energy saving can be promoted, and since a non-fluorinated water repellent agent is used, the environmental load can be reduced.

Advantageous Effects of Invention

According to the present invention, a non-fluorinated polymer that has excellent storage stability, can impart sufficient water repellency to a textile product or the like even in a case in which a heat treatment is not carried out, and can produce a water-repellent textile product having excellent texture and water repellency, the water-repellent textile product thus obtainable possibly having sufficient peeling strength with respect to a coating; and a water repellent agent composition including the non-fluorinated polymer can be provided.

According to the water repellent agent composition of the present invention, even in a case in which a treated base material is coated with a urethane resin, an acrylic resin or the like, a balance can be achieved between the water repellency and the peeling strength with respect to a coating.

Furthermore, the water repellent agent composition of the present invention exhibits excellent water repellency even though it is a water repellent agent composition that does not include a compound having a fluoroalkyl group or fluorine, can be utilized as a substitute for a fluorinated water repellent agent, and can solve the concerns about providing a fluorine supply source or the influence on the environment or the like. Meanwhile, after a water repellent agent composition is attached to a textile product or the like, it is usually preferable to perform a heat treatment. However, since the water repellent agent composition of the present invention does not use a monomer having a fluoroalkyl group, even in a case in which the heat treatment is performed under mild conditions of 130° C. or lower, high water repellency can be manifested. Furthermore, when a heat treatment is performed at a high temperature exceeding 130° C., the heat treatment time can be shortened compared to the case of a fluorinated water repellent agent. Therefore, since heat-induced denaturation of the material to be treated is suppressed, the texture becomes soft, and the water repellent agent composition is also superior in terms of cost, such as that the amount of heat applied to the heat treatment can be reduced.

Furthermore, according to the present invention, when a particular reactive emulsifier is used instead of a general surfactant as an emulsifying dispersant that is used for emulsion or dispersion polymerization of a non-fluorinated polymer, the amount of the surfactant that is to be included in the water repellent agent composition can be decreased. As a result, deterioration of the water repellency of a textile product or the like thus obtainable can be suppressed, and water repellency that is superior to that of conventional non-fluorinated water repellent agents can be realized. Furthermore, since the water repellent agent composition according to the present invention can enhance the emulsification dispersibility of a non-fluorinated polymer itself, a stable emulsified state can be easily maintained even in a case in which the water repellent agent composition is added to a processing bath, and it is possible to cope with various textile processing.

DESCRIPTION OF EMBODIMENTS

The water repellent agent composition of the present embodiment includes a non-fluorinated polymer containing a constituent unit derived from a (meth)acrylic acid ester monomer (A) represented by the following General Formula (A-1) (hereinafter, also referred to as "component (A)") and a constituent unit derived from at least one monomer (E) from between vinyl chloride and vinylidene chloride (hereinafter, also referred to as "component (E)") (hereinafter, referred to as non-fluorinated polymer of the present embodiment).

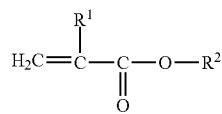

(A-1)

wherein in Formula (A-1), $R^1$ represents a hydrogen or a methyl group; and $R^2$ represents a monovalent hydrocarbon group having 12 or more carbon atoms which may have a substituent.

Here, the term "(meth)acrylic acid ester" means an "acrylic acid ester" or a "methacrylic acid ester" corresponding thereto, and the same also applies to "(meth)acrylic acid", "(meth)acrylamide", and the like.

The (meth)acrylic acid ester monomer (A) represented by General Formula (A-1) described above, which is used for the present embodiment, has a monovalent hydrocarbon group having 12 or more carbon atoms which may have a substituent. This hydrocarbon group may be linear or branched, may be a saturated hydrocarbon group or an unsaturated hydrocarbon group, and may have an alicyclic or aromatic cyclic form. Among these, it is preferable that the hydrocarbon group is linear, and it is more preferable that the hydrocarbon group is a linear alkyl group. In this case, superior water repellency is obtained. In a case in which the monovalent hydrocarbon group having 12 or more carbon atoms has a substituent, the substituent may be one or more of a hydroxyl group, an amino group, a carboxyl group, an epoxy group, an isocyanate group, a blocked isocyanate group, and a (meth)acryloyloxy group. In the present embodiment, it is preferable that $R^2$ in General Formula (A-1) described above is an unsubstituted hydrocarbon group.

The number of carbon atoms of the hydrocarbon group is preferably 12 to 24. If the number of carbon atoms is less than 12, when the non-fluorinated polymer is attached to a textile product or the like, sufficient water repellency cannot be manifested. Meanwhile, if the number of carbon atoms is more than 24, when the non-fluorinated polymer is attached to a textile product or the like, the texture of the textile product tends to become rough and hard, compared to the case in which the number of carbon atoms is in the above-mentioned range.

The number of carbon atoms of the hydrocarbon group is more preferably 12 to 21. When the number of carbon atoms is in this range, especially excellent water repellency and texture are obtained. A particularly preferred hydrocarbon group is a linear alkyl group having 12 to 18 carbon atoms.

Examples of the component (A) include stearyl (meth)acrylate, cetyl (meth)acrylate, lauryl (meth)acrylate, dodecyl (meth)acrylate, myristyl (meth)acrylate, pentadecyl (meth)acrylate, heptadecyl (meth)acrylate, nonadecyl (meth)acrylate, eicosyl (meth)acrylate, heneicosyl (meth)acrylate, behenyl (meth)acrylate, ceryl (meth)acrylate, and melissyl (meth)acrylate.

The component (A) can have at least one functional group selected from the group consisting of a hydroxyl group, an amino group, a carboxyl group, an epoxy group, and an isocyanate group, all of which can react with a crosslinking agent. In this case, durable water repellency of the textile product thus obtainable can be further enhanced. The isocyanate group may form a blocked isocyanate group that is protected with a blocking agent. Furthermore, in a case in which the component (A) has an amino group, the texture of the textile product thus obtainable can be further enhanced.

The component (A) is preferably a monofunctional (meth)acrylic acid ester monomer having one polymerizable unsaturated group in one molecule.

Regarding the component (A), one kind may be used alone, or two or more kinds thereof may be used in combination.

In regard to the component (A), it is preferable to use an acrylic acid ester monomer (a1) and a methacrylic acid ester monomer (a2) in combination, from the viewpoint of durable water repellency of the textile product thus obtainable. The ratio (a1)/(a2) of the mass of component (a1) and the mass of component (a2) that are mixed is preferably 30/70 to 90/10, more preferably 40/60 to 85/15, and even more preferably 50/50 to 80/20. In a case in which the ratio (a1)/(a2) is within the range described above, the textile product thus obtainable acquires more satisfactory durable water repellency. When the ratio (a1)/(a2) is more than 90/10, or less than 30/70, the durable water repellency of the textile product thus obtainable tends to deteriorate.

The at least one monomer (E) from between vinyl chloride and vinylidene chloride, which is used for the present embodiment, is incorporated as a copolymerized component of the non-fluorinated polymer of the present embodiment and is preferably vinyl chloride from the viewpoints of the water repellency of the textile product thus obtainable and the peeling strength with respect to a coating.

The content proportions of the constituent unit derived from component (A) and the constituent unit derived from component (E) in the non-fluorinated polymer of the present embodiment are such that, from the viewpoints of the emulsion stability of the non-fluorinated polymer of the present embodiment and the peeling strength of the textile product thus obtainable with respect to a coating, the ratio (A)/(E) of the mass of component (A) and the mass of component (E) that are mixed is preferably 40/60 to 90/10, more preferably 50/50 to 85/15, and even more preferably 60/40 to 80/20. When the ratio (A)/(E) is more than 90/10, the peeling strength of the textile product thus obtainable with respect to a coating tends to decrease. When the ratio (A)/(E) is less than 40/60, the emulsion stability of the non-fluorinated polymer of the present embodiment tends to decrease.

Furthermore, the total mass of the mass of component (A) and the mass of component (E) that are mixed is preferably 80% to 100% by mass, more preferably 85% to 99% by mass, and even more preferably 90% to 98% by mass, with respect to the total amount of the monomer components that constitute the non-fluorinated polymer.

The weight average molecular weight of the non-fluorinated polymer of the present embodiment is preferably 100,000 or more. If the weight average molecular weight is less than 100,000, the water repellency of the textile product thus obtainable tends to become insufficient. Furthermore, the weight average molecular weight of the non-fluorinated polymer is more preferably 500,000 or more. In this case, the textile product thus obtainable can exhibit water repellency more sufficiently. The upper limit of the weight average molecular weight of the non-fluorinated polymer is preferably about 5,000,000.

According to the present embodiment, the melt viscosity at 105° C. of the non-fluorinated polymer is preferably 1,000 Pa·s or less. If the melt viscosity at 105° C. is higher than 1,000 Pa·s, the texture of the textile product thus obtainable tends to become rough and hard. If the melt viscosity of the non-fluorinated polymer is too high, when a water repellent agent composition is obtained by emulsifying or dispersing the non-fluorinated polymer, the non-fluorinated polymer may be precipitated or settled, and the storage stability of the water repellent agent composition tends to deteriorate. Meanwhile, the melt viscosity at 105° C. is more preferably 500 Pa·s or lower. In this case, the textile product thus obtainable or the like acquires superior texture while exhibiting sufficient water repellency.

The "melt viscosity at 105° C." refers to the viscosity obtainable using an elevated type flow tester (for example, CFT-500 manufactured by Shimadzu Corp.), by introducing 1 g of a non-fluorinated polymer into a cylinder equipped with a die (length 10 mm, diameter 1 mm), maintaining the polymer at 105° C. for 6 minutes, and measuring the viscosity while a load of 100 kg·f/cm² is applied thereto by means of a plunger.

In a case in which the weight average molecular weight of the non-fluorinated polymer of the present embodiment is equal, the water repellency of the textile product having the polymer attached thereto tends to become superior as the mixing proportion of a non-fluorinated (meth)acrylic acid ester monomer is higher. Furthermore, the performance such as durable water repellency or texture of the textile product having the polymer attached thereto, can be enhanced by copolymerizing a copolymerizable non-fluorinated monomer.

It is preferable that the non-fluorinated polymer of the present embodiment contains, in addition to component (A) and component (E), at least one reactive emulsifier (B) (hereinafter, also referred to as "component (B)") selected from among (B1) a compound represented by the following General Formula (I-1) and having a HLB of 7 to 18; (B2) a compound represented by the following General Formula (I-1) and having a HLB of 7 to 18; and (B3) a compound having a HLB of 7 to 18 and obtainable by adding an alkylene oxide having 2 to 4 carbon atoms to an oil or fat having a hydroxyl group and a polymerizable unsaturated group, as a monomer component, from the viewpoint that the water repellency of the textile product thus obtainable, and the emulsion stability in the composition during emulsion polymerization or dispersion polymerization and after polymerization of the non-fluorinated polymer of the present embodiment can be enhanced.

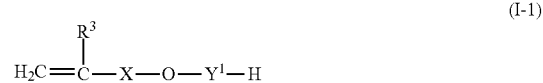

(I-1)

wherein in Formula (I-1), $R^3$ represents a hydrogen or a methyl group; X represents a linear or branched alkylene group having 1 to 6 carbon atoms; and $Y^1$ represents a divalent group including an alkyleneoxy group having 2 to 4 carbon atoms.

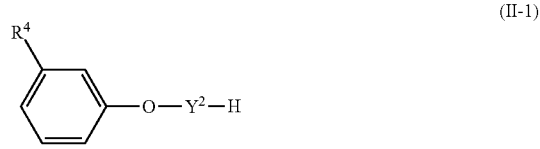

(II-1)

wherein in Formula (II-1), $R^4$ represents a monovalent unsaturated hydrocarbon group having 13 to 17 carbon atoms and having a polymerizable unsaturated group; and $Y^2$ represents a divalent group including an alkyleneoxy group having 2 to 4 carbon atoms.

The "reactive emulsifier" is an emulsion dispersant having radical reactivity, that is, a surfactant having one or more polymerizable unsaturated groups in the molecule, and can be copolymerized with a monomer such as a (meth)acrylic acid ester.

Furthermore, the "HLB" is a HLB value calculated by the Griffin method by considering an ethyleneoxy group as a hydrophilic group and all other groups as lipophilic groups.

The HLB values of the compounds of (B1) to (B3) used for the present embodiment are 7 to 18, and from the viewpoint of the emulsion stability in the composition during emulsion polymerization or dispersion polymerization and after polymerization of the non-fluorinated polymer of the present embodiment (hereinafter, simply referred to as emulsion stability), the HLB values are preferably 9 to 15. Furthermore, from the viewpoint of storage stability of the water repellent agent composition, it is more preferable to use two or more kinds of reactive emulsifiers (B) having different HLB values within the above-mentioned range in combination.

In regard to the reactive emulsifier (B1) represented by General Formula (I-1) used for the present embodiment, $R^3$ represents a hydrogen or a methyl group, and it is more preferable that $R^3$ is a methyl group in view of copolymerizability with component (A). X represents a linear or branched alkylene group having 1 to 6 carbon atoms, and from the viewpoint of emulsion stability of the non-fluorinated polymer of the present embodiment, a linear alkylene group having 2 or 3 carbon atoms is more preferred. $Y^1$ represents a divalent group including an alkyleneoxy group having 2 to 4 carbon atoms. The type, combination, and the number of addition of the alkyleneoxy group in $Y^1$ can be selected as appropriate such that the HLB value is within the range described above. Furthermore, when two or more kinds of alkyleneoxy groups are used, they can have a block addition structure or a random addition structure.

The compound represented by General Formula (I-1) is preferably a compound represented by the following General Formula (I-2).

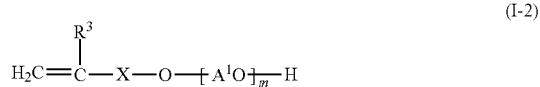

(I-2)

wherein in Formula (I-2), $R^3$ represents a hydrogen or a methyl group; X represents a linear or branched alkylene group having 1 to 6 carbon atoms; $A^1O$ represents an alkyleneoxy group having 2 to 4 carbon atoms; m can be selected as appropriate such that the HLB value is within the range described above, while specifically, m is preferably an integer from 1 to 80; and when m is 2 or greater, m units of $A^1O$ may be identical or different.

In regard to the compound represented by General Formula (I-2), $R^3$ represents a hydrogen or a methyl group, and it is more preferable that $R^3$ is a methyl group from the viewpoint of copolymerizability with component (A). X represents a linear or branched alkylene group having 1 to 6 carbon atoms, and from the viewpoint of emulsion stability of the non-fluorinated polymer of the present embodiment, a linear alkylene group having 2 or 3 carbon atoms is more preferred. $A^1O$ represents an alkyleneoxy group having 2 to 4 carbon atoms. The type and combination of $A^1O$, and the number of m can be selected as appropriate such that the HLB value is within the range described above. From the viewpoint of emulsion stability of the non-fluorinated polymer of the present embodiment, m is preferably an integer from 1 to 80, and more preferably an integer from 1 to 60. When m is 2 or greater, m units of $A^1O$ may be identical or different. Furthermore, when there are two or more kinds of $A^1O$, they can have a block addition structure or a random addition structure.

The reactive emulsifier (B1) represented by General Formula (I-2) can be obtained by a conventionally known method and is not particularly limited. Furthermore, the reactive emulsifier (B1) is easily available from commercially available products, and examples include "LATEMUL PD-420", "LATEMUL PD-430", and "LATEMUL PD-450" manufactured by Kao Corp.

In regard to the reactive emulsifier (B2) represented by General Formula (II-1) used for the present embodiment, $R^4$ represents a monovalent unsaturated hydrocarbon group having 13 to 17 carbon atoms and having a polymerizable unsaturated group, and examples include a tridecenyl group, a tridecadienyl group, a tetradecenyl group, a tetradienyl group, a pentadecenyl group, a pentadecadienyl group, a pentadecatrienyl group, a heptadecenyl group, a heptadecadienyl group, and a heptadecatrienyl group. From the viewpoint of emulsion stability of the non-fluorinated polymer of the present embodiment, $R^4$ is more preferably a monovalent unsaturated hydrocarbon group having 14 to 16 carbon atoms.

$Y^2$ represents a divalent group including an alkyleneoxy group having 2 to 4 carbon atoms. The type, combination, and the number of addition of the alkyleneoxy group for $Y^2$ can be selected as appropriate such that the HLB value is within the range described above. In a case in which two or more kinds of alkyleneoxy groups are used, they can have a block addition structure or a random addition structure. From the viewpoint of emulsion stability of the non-fluorinated polymer of the present embodiment, the alkyleneoxy group is more preferably an ethyleneoxy group.

The compound represented by General Formula (I-1) is preferably a compound represented by the following General Formula (II-2).

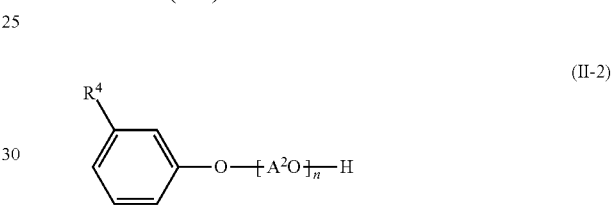

(II-2)

wherein in Formula (II-2), $R^4$ represents a monovalent unsaturated hydrocarbon group having 13 to 17 carbon atoms and having a polymerizable unsaturated group; $A^2O$ represents an alkyleneoxy group having 2 to 4 carbon atoms; n can be selected as appropriate such that the HLB value is within the range described above, while specifically, n is preferably an integer from 1 to 50; and when n is 2 or greater, n units of $A^2O$ may be identical or different.

Examples of $R^4$ for the compound represented by General Formula (II-2) may include groups similar to $R^4$ for the General Formula (II-1).

$A^2O$ represents an alkyleneoxy group having 2 to 4 carbon atoms. In view of the emulsion stability of the non-fluorinated polymer of the present embodiment, the type and combination of $A^2O$ and the number of n can be selected as appropriate such that the HLB value is within the range described above. In view of the emulsion stability of the non-fluorinated polymer of the present embodiment, $A^2O$ is more preferably an ethyleneoxy group, and n is preferably an integer from 1 to 50, more preferably an integer from 5 to 20, and even more preferably an integer from 8 to 14. When n is 2 or greater, n units of $A^2O$ may be identical or different. Furthermore, in a case in which two or more kinds of $A^2O$ are used, they can have a block addition structure or a random addition structure.

The reactive emulsifier (B2) represented by General Formula (II-2), which is used for the present embodiment, can be synthesized by adding an alkylene oxide to a phenol having a corresponding unsaturated hydrocarbon group by a conventionally known method, and there are no particular limitations. For example, the reactive emulsifier (B2) can be synthesized by adding a predetermined amount of an alkylene oxide using an alkali catalyst such as caustic soda or caustic potash under pressure at 120° C. to 170° C.

The phenol having a corresponding unsaturated hydrocarbon group includes industrially produced pure products or mixtures, as well as pure products or mixtures extracted and purified from plants and the like. Examples include 3-[8(Z),11(Z),14-pentadecatrienyl]phenol, 3-[8(Z),11(Z)-pentadecadienyl]phenol, 3-[8(Z)-pentadecenyl]phenol, and 3-[11(Z)-pentadecenyl]phenol, which are extracted from cashew nut shell and the like and are collectively called cardanols.

The reactive emulsifier (B3) used for the present embodiment is a compound having a HLB of 7 to 18 and obtainable by adding an alkylene oxide having 2 to 4 carbon atoms to an oil or fat having a hydroxyl group and a polymerizable unsaturated group. Examples of the oil or fat having a hydroxyl group and a polymerizable unsaturated group include mono- or diglycerides of fatty acids which may include hydroxyl-unsaturated fatty acids (palmitoleic acid, oleic acid, linoleic acid, α-linolenic acid, arachidonic acid, eicosapentaenoic acid, docosapentaenic acid, and the like); and triglycerides of fatty acids including at least one hydroxyl unsaturated fatty acid (ricinolic acid, ricinelaidic acid, 2-hydroxytetracosenoic acid, and the like). In view of the emulsion stability of the non-fluorinated polymer of the present embodiment, an alkylene oxide adduct of a triglyceride of a fatty acid including at least one hydroxyl unsaturated fatty acid is preferred; a C2-C4 alkylene oxide adduct of castor oil (triglyceride of fatty acids including ricinoleic acid) is more preferred; and an ethylene oxide adduct of castor oil is even more preferred. Furthermore, the number of added moles of the alkylene oxide can be selected as appropriate such that the HLB value is within the range described above, and in view of the emulsion stability of the non-fluorinated polymer of the present embodiment, the number of added moles is more preferably 20 to 50 moles, and even more preferably 25 to 45 moles. Furthermore, when there are two or more kinds of alkylene oxides, they can have a block addition structure or a random addition structure.

The reactive emulsifier (B3) used for the present embodiment can be synthesized by adding an alkylene oxide to an oil or fat having a hydroxyl group and a polymerizable unsaturated group by a conventionally known method, and there are no particular limitations. For example, the reactive emulsifier (B3) can be synthesized by adding a predetermined amount of an alkylene oxide to triglycerides of fatty acids including ricinoleic acid, that is, castor oil, using an alkali catalyst such as caustic soda or caustic potash under pressure at 120° C. to 170° C.

From the viewpoint that the water repellency of the textile product thus obtainable, and the emulsion stability in the composition during emulsion polymerization or dispersion polymerization and after polymerization of the non-fluorinated polymer of the present embodiment can be enhanced, the compositional proportion of the monomer of component (B) in the non-fluorinated polymer of the present embodiment is preferably 0.5% to 20% by mass, more preferably 1% to 15% by mass, and even more preferably 3% to 10% by mass, with respect to the total amount of the monomer components that constitute the non-fluorinated polymer.

From the viewpoint that durable water repellency of the textile product thus obtainable can be enhanced, it is preferable that the non-fluorinated polymer included in the water repellent composition of the present embodiment contains, as a monomer component, at least one second (meth)acrylic acid ester monomer (C) (hereinafter, also referred to as "component (C)") selected from the group consisting of the following (C1), (C2), (C3), and (C4), in addition to component (A) and component (E).

(C1) (Meth)Acrylic Acid Ester Monomer Represented by Following General Formula (C-1)

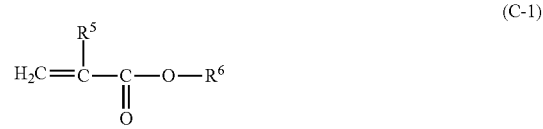

wherein in Formula (C-1), $R^5$ represents a hydrogen or a methyl group; and $R^6$ represents a monovalent chain-like hydrocarbon group having 1 to 11 carbon atoms and having at least one functional group selected from the group consisting of a hydroxyl group, an amino group, a carboxyl group, an epoxy group, an isocyanate group, and a (meth)acryloyloxy group, provided that the number of (meth)acryloyloxy groups in the molecule is 2 or less.

(C2) (Meth)Acrylic Acid Ester Monomer Represented by Following General Formula (C-2)

wherein in Formula (C-2), $R^7$ represents a hydrogen or a methyl group; and $R^8$ represents a monovalent cyclic hydrocarbon group having 1 to 11 carbon atoms which may have a substituent.

(C3) Methacrylic Acid Ester Monomer Represented by Following General Formula (C-3)

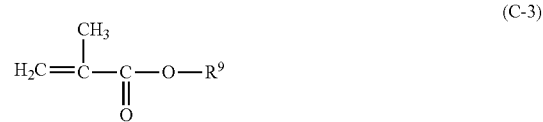

wherein in Formula (C-3), $R^9$ represents an unsubstituted monovalent chain-like hydrocarbon group having 1 to 4 carbon atoms.

(C4) (Meth)Acrylic Acid Ester Monomer Represented by Following General Formula (C-4)

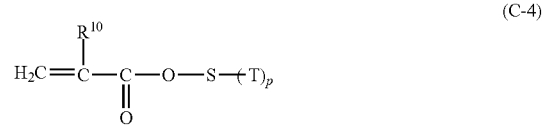

wherein in Formula (C-4), $R^{10}$ represents a hydrogen or a methyl group; p represents an integer of 2 or larger, S represents an organic group having a valence of (p+1); and T represents a monovalent organic group having a polymerizable unsaturated group.

The monomer of (C1) is a (meth)acrylic acid ester monomer having a monovalent chain-like hydrocarbon group having 1 to 11 carbon atoms and having at least one functional group selected from the group consisting of a hydroxyl group, an amino group, a carboxyl group, an epoxy group, an isocyanate group, and a (meth)acryloyloxy group in the ester moiety. From the viewpoint of being capable of reacting with a crosslinking agent, it is preferable that the monovalent chain-like hydrocarbon group having 1 to 11 carbon atoms has at least one functional group selected from the group consisting of a hydroxyl group, an amino group, a carboxyl group, an epoxy group, and an isocyanate group. When a non-fluorinated polymer containing the monomer of (C1) having such a group that is capable of reacting with a crosslinking agent is used to treat a textile product together with a crosslinking agent, the durable water repellency can be enhanced while the texture of the textile product thus obtainable is maintained. The isocyanate group may be a blocked isocyanate group that is protected with a blocking agent.

The chain-like hydrocarbon group may be linear or branched, and may be a saturated hydrocarbon group or an unsaturated hydrocarbon group. Furthermore, the chain-like hydrocarbon group may further have a substituent other than the functional group. Above all, the chain-like hydrocarbon group is preferably a linear group, and/or a saturated hydrocarbon group, from the viewpoint that the durable water repellency of the textile product thus obtainable can be enhanced.

Specific examples of the monomer of (C1) include 2-hydroxyethyl (meth)acrylate, dimethylaminoethyl (meth)acrylate, glycidyl (meth)acrylate, and 1,1-bis(acryloyloxymethyl)ethyl isocyanate. These monomers may be used singly, or two or more kinds thereof may be used in combination. Among them, 2-hydroxyethyl (meth)acrylate, glycidyl (meth)acrylate, and 1,1-bis(acryloyloxymethyl)ethyl isocyanate are preferred from the viewpoint that the durable water repellency of the textile product thus obtainable can be enhanced. From the viewpoint of further enhancing the texture of the textile product thus obtainable, dimethylaminoethyl (meth)acrylate is preferred.

The compositional proportion of the monomer of (C1) in the non-fluorinated polymer of the present embodiment is preferably 1% to 30% by mass, more preferably 3% to 25% by mass, and even more preferably 5% to 20% by mass, with respect to the total amount of the monomer components that constitute the non-fluorinated polymer, from the viewpoints of water repellency and texture of the textile product thus obtainable.

The monomer of (C2) is a (meth)acrylic acid ester monomer having a monovalent cyclic hydrocarbon group having 1 to 11 carbon atoms in the ester moiety, and examples of the cyclic hydrocarbon group include an isobornyl group, a cyclohexyl group, and a dicyclopentanyl group. These cyclic hydrocarbon groups may each have a substituent such as an alkyl group. However, in a case in which the substituent is a hydrocarbon group, a hydrocarbon group in which the sum total of the numbers of carbon atoms of the substituent and the cyclic hydrocarbon group is 11 or less is selected. Furthermore, it is preferable that these cyclic hydrocarbon groups are directly bonded to an ester bond, from the viewpoint of enhancing the durable water repellency. The cyclic hydrocarbon group may be alicyclic or aromatic, and in the case of an alicyclic group, the cyclic hydrocarbon group may be a saturated hydrocarbon group or an unsaturated hydrocarbon group. Specific examples of the monomer include isobornyl (meth)acrylate, cyclohexyl (meth)acrylate, and dicyclopentanyl (meth)acrylate. These monomers may be used singly, or two or more kinds thereof may be used in combination. Among them, isobornyl (meth)acrylate and cyclohexyl methacrylate are preferred, and isobornyl methacrylate is more preferred, from the viewpoint that the durable water repellency of the textile product thus obtainable can be enhanced.

The compositional proportion of the monomer of (C2) in the non-fluorinated polymer of the present embodiment is preferably 1% to 30% by mass, more preferably 3% to 25% by mass, and even more preferably 5% to 20% by mass, with respect to the total amount of the monomer components that constitute the non-fluorinated polymer, from the viewpoints of water repellency and texture of the textile product thus obtainable.

The monomer of (C3) is a methacrylic acid ester monomer in which an unsubstituted monovalent chain-like hydrocarbon group having 1 to 4 carbon atoms is directly bonded to the ester bond of the ester moiety. Regarding the chain-like hydrocarbon group having 1 to 4 carbon atoms, a linear hydrocarbon group having 1 or 2 carbon atoms and a branched hydrocarbon group having 3 or 4 carbon atoms are preferred. Examples of the chain-like hydrocarbon group having 1 to 4 carbon atoms include a methyl group, an ethyl group, a n-propyl group, an isopropyl group, a n-butyl group, and a t-butyl group. Specific examples of the compound include methyl methacrylate, ethyl methacrylate, n-propyl methacrylate, isopropyl methacrylate, n-butyl methacrylate, isobutyl methacrylate, and t-butyl methacrylate. These monomers may be used singly, or two or more kinds thereof may be used in combination. Among them, methyl methacrylate, isopropyl methacrylate, and t-butyl methacrylate are preferred, and methyl methacrylate is more preferred, from the viewpoint that the durable water repellency of the textile product thus obtainable can be enhanced.

The compositional proportion of the monomer of (C3) in the non-fluorinated polymer of the present embodiment is preferably 1% to 30% by mass, more preferably 3% to 25% by mass, and even more preferably 5% to 20% by mass, with respect to the total amount of the monomer components that constitute the non-fluorinated polymer, from the viewpoints of water repellency and texture of the textile product thus obtainable.

The monomer of (C4) is a (meth)acrylic acid ester monomer having three or more polymerizable unsaturated groups in one molecule. According to the present embodiment, a polyfunctional (meth)acrylic acid ester monomer having three or more (meth)acryloyloxy groups in one molecule, in which T in General Formula (C-4) described above is a (meth)acryloyloxy group, is preferred. In Formula (C-4), p units of T may be identical or different. Specific examples of the compound include ethoxylated isocyanuric acid triacrylate, tetramethylolmethane tetraacrylate, tetramethylolmethane tetramethacrylate, trimethylolpropane triacrylate, trimethylolpropane trimethacrylate, pentaerythritol triacrylate, pentaerythritol trimethacrylate, dipentaerythritol hexaacrylate, and dipentaerythritol hexamethylacrylate. These monomers may be used singly, or two or more kinds thereof may be used in combination. Among them, tetramethylolmethane tetraacrylate and ethoxylated isocyanuric acid triacrylate are more preferred from the viewpoint that the durable water repellency of the textile product thus obtainable can be enhanced.

The compositional proportion of the monomer of (C4) in the non-fluorinated polymer of the present embodiment is preferably 1% to 30% by mass, more preferably 3% to 25% by mass, and even more preferably 5% to 20% by mass, with respect to the total amount of the monomer components that constitute the non-fluorinated polymer, from the viewpoints of water repellency and texture of the textile product thus obtainable.

The total compositional proportion of the monomers of component (C) in the non-fluorinated polymer of the present embodiment is preferably 1% to 30% by mass, more preferably 3% to 25% by mass, and even more preferably 5% to 20% by mass, with respect to the total amount of the monomer components that constitute the non-fluorinated polymer, from the viewpoints of water repellency and texture of the textile product thus obtainable.

The non-fluorinated polymer included in the water repellent agent composition of the present embodiment can contain, in addition to component (A), component (E), component (B), and component (C), a monofunctional monomer (D) capable of being copolymerized with these components, to the extent that the effects of the present invention are not impaired.

Examples of the monomer of (D) include vinyl-based monomers other than component (E), which do not contain fluorine, such as (meth)acryloylmorpholine, a (meth)acrylic acid ester having a hydrocarbon group other than component (A) and component (C), (meth)acrylic acid, fumaric acid ester, maleic acid ester, fumaric acid, maleic acid, (meth)acrylamide, N-methylolacrylamide, vinyl ethers, vinyl esters, ethylene, and styrene. Meanwhile, the (meth)acrylic acid ester having a hydrocarbon group, which is other than component (A) and component (C), may have a substituent such as a vinyl group, a hydroxyl group, an amino group, an epoxy group, an isocyanate group, or a blocked isocyanate group as the hydrocarbon group, may have a substituent other than a group that can react with a crosslinking agent such as a quaternary ammonium group, and may have an ether bond, an ester bond, an amide bond, a urethane bond, or the like. Examples of the (meth)acrylic acid ester other than component (A) and component (C) include methyl acrylate, 2-ethylhexyl (meth)acrylate, benzyl (meth)acrylate, and ethylene glycol di(meth)acrylate. Among them, (meth)acryloylmorpholine is more preferred from the viewpoint that the peeling strength of the textile product thus obtainable with respect to a coating can be increased.

The compositional proportion of the monomer of (D) in the non-fluorinated polymer of the present embodiment is preferably 10% by mass or less with respect to the total amount of the monomer components that constitute the non-fluorinated polymer, from the viewpoints of water repellency and texture of the textile product thus obtainable.

It is preferable that the non-fluorinated polymer included in the water repellent agent composition of the present embodiment has at least one functional group selected from the group consisting of a hydroxyl group, an amino group, a carboxyl group, an epoxy group, and an isocyanate group, which are all capable of reacting with a crosslinking agent, from the viewpoint of enhancing the durable water repellency of the textile product thus obtainable. The isocyanate group may form a blocked isocyanate group that is protected with a blocking agent. Furthermore, it is preferable that the non-fluorinated polymer has an amino group, in view of enhancing the texture of the textile product thus obtainable, too.

It is also possible to add additives and the like to the water repellent agent composition of the present embodiment, if necessary. Examples of the additives include another water repellent agent, a crosslinking agent, an antibacterial deodorant, a flame retardant, an antistatic agent, a fabric softener, and an anti-crease agent.

Next, a method for producing a water repellent agent composition including the non-fluorinated polymer of the present embodiment will be explained.

A water repellent agent composition including a non-fluorinated polymer can be produced by a radical polymerization method. Furthermore, from this radical polymerization method, it is preferable that polymerization is carried out by an emulsion polymerization method or a dispersion polymerization method, in view of the performance of the water repellent agent thus obtainable and in an environmental aspect.

For example, a non-fluorinated polymer can be obtained by subjecting the (meth)acrylic acid ester monomer (A) represented by General Formula (A-1) to emulsion polymerization or dispersion polymerization in the presence of the aforementioned component (E) in a medium. More specifically, for example, component (A), component (E), and if necessary, the aforementioned component (B), the aforementioned component (C), and the aforementioned component (D), as well as an emulsification aid or a dispersion aid are added to a medium, this mixed liquid is emulsified or dispersed, and thereby, an emulsion or a dispersion is obtained. As a polymerization initiator is added to the emulsion or dispersion thus obtained, a polymerization reaction is initiated, and thus the monomers and the reactive emulsifier can be polymerized. Examples of the means for emulsifying or dispersing the mixed liquid include a homomixer, a high pressure emulsifying machine, or an ultrasonicator.

Regarding the emulsification aid or dispersion aid (hereinafter, also referred to as "emulsification aid or the like"), one or more selected from a nonionic surfactant, a cationic surfactant, an anionic surfactant, and an amphoteric surfactant, all other than the reactive emulsifier (B), can be used. The content of the emulsification aid or the like is preferably 0.5 to 30 parts by mass, more preferably 1 to 20 parts by mass, and even more preferably 1 to 10 parts by mass, with respect to 100 parts by mass of all the monomers. If the content of the emulsification aid or the like is less than 0.5 parts by mass, the dispersion stability of the mixed liquid tends to deteriorate, compared to the case in which the content of the emulsification aid or the like is within the range described above. If the content of the emulsification aid or the like is more than 30 parts by mass, the water repellency of the non-fluorinated polymer thus obtainable tends to deteriorate, compared to the case in which the content of the emulsification aid or the like is within the range described above.

The medium for the emulsion polymerization or dispersion polymerization is preferably water, and if necessary, water may be mixed with an organic solvent. The organic solvent used at this time is not particularly limited as long as it is an organic solvent that is miscible with water; however, examples include alcohols such as methanol and ethanol; esters such as ethyl acetate; ketones such as acetone and methyl ethyl ketone; ethers such as diethyl ether; and glycols such as propylene glycol, dipropylene glycol, and tripropylene glycol. Meanwhile, the ratio of water and the organic solvent is not particularly limited.

Regarding the polymerization initiator, known polymerization initiators such as azo-based, peroxide-based, or redox-based polymerization initiators can be used as appropriate. The content of the polymerization initiator is preferably 0.01 to 2 parts by mass with respect to 100 parts by mass of all the monomers. When the content of the polymerization initiator is in the range described above, a non-fluorinated polymer having a weight average molecular weight of 100,000 or more can be produced efficiently.

Furthermore, a chain transfer agent such as dodecylmercaptan or t-butyl alcohol may also be used in the polymerization reaction for the purpose of adjusting the molecular weight. The content of the chain transfer agent is preferably 0.3 parts by mass or less, and more preferably 0.1 parts by mass or less, with respect to 100 parts by mass of all the monomers. If the content of the chain transfer agent is more than 0.1 parts by mass, a decrease in the molecular weight is brought about, and efficient production of a non-fluorinated polymer having a weight average molecular weight of 100,000 or more tends to become difficult.

A polymerization inhibitor may also be used for the adjustment of the molecular weight. A non-fluorinated polymer having a desired weight average molecular weight can be easily obtained by adding a polymerization inhibitor.

The temperature of the polymerization reaction is preferably 20° C. to 150° C. If the temperature is below 20° C., polymerization tends to proceed insufficiently compared to the case in which the temperature is within the range described above. If the temperature is above 150° C., control of the reaction heat may become difficult.

In regard to the polymerization reaction, the weight average molecular weight of the non-fluorinated polymer thus obtainable can be adjusted by increasing or decreasing the content of the polymerization initiator, chain transfer agent, or polymerization inhibitor mentioned above, and the melt viscosity at 105° C. can be adjusted by increasing or decreasing the content of the polyfunctional monomer and the content of the polymerization initiator. Meanwhile, in a case in which it is wished to decrease the melt viscosity at 105° C., the content of a monomer having two or more polymerizable functional groups may be decreased, or the content of the polymerization initiator may be increased.

The content of the non-fluorinated polymer in the polymer emulsion liquid or dispersion liquid obtainable by emulsion polymerization or dispersion polymerization is preferably adjusted to 10% to 50% by mass, and more preferably to 20% to 40% by mass, with respect to the total amount of the emulsion liquid or dispersion liquid, from the viewpoints of storage stability and handleability of the composition.

The water-repellent textile product of the present embodiment is formed from a textile product with the aforementioned non-fluorinated polymer of the present embodiment attached thereto.

A method for producing the water-repellent textile product of the present embodiment will be explained.

The water-repellent textile product of the present embodiment is obtained by attaching the non-fluorinated polymer to a textile product by treating the textile product with a treatment liquid containing the water repellent agent composition described above. There are no particular limitations on the material for such a textile product, and examples include natural fabrics such as cotton, hemp, silk, and wool; semisynthetic fabrics such as rayon and acetate; synthetic fabrics such as nylon, polyester, polyurethane, and polypropylene; and composite fabrics and blended fabrics thereof. The form of the textile product may be any of fiber, yarn, nonwoven fabric, and paper.

Examples of the method of treating a textile product with the treatment liquid include processing methods such as immersion, spraying, and coating. Furthermore, in a case in which the water repellent agent composition includes water, it is preferable that the water repellent agent composition is attached to the textile product, and then the textile product is dried in order to remove water.

The amount of attachment of the water repellent agent composition to a textile product can be appropriately adjusted according to the degree of water repellency required; however, it is preferable that the amount of attachment of the water repellent agent composition is adjusted such that the amount of attachment of the non-fluorinated polymer included in the water repellent agent composition becomes 0.01 to 10 g, and more preferably 0.05 to 5 g. If the amount of attachment of the non-fluorinated polymer is less than 0.01 g, there is a tendency that the textile product may not exhibit sufficient water repellency, compared to the case in which the amount of attachment of the non-fluorinated polymer is within the range described above. If the amount of attachment is more than 10 g, the texture of the textile product tends to become rough and hard, compared to the case in which the amount of attachment of the non-fluorinated polymer is within the range described above.

Furthermore, after the non-fluorinated polymer of the present embodiment is attached to a textile product, it is preferable that the textile product is heat-treated as appropriate. There are no particular limitations on the temperature conditions; however, when the water repellent agent composition of the present embodiment is used, the textile product can be made to exhibit sufficiently satisfactory water repellency under mild conditions of 100° C. to 130° C. The temperature conditions may be a high-temperature treatment at 130° C. or higher (preferably up to 200° C.); however, in such a case, it is possible to shorten the treatment time compared to conventional cases of using a fluorinated water repellent agent. Therefore, when the water-repellent textile product of the present embodiment is used, denaturation of the textile product caused by heat is suppressed, the texture of the textile product at the time of water repellent treatment becomes soft, and sufficient water repellency can be imparted to a textile product under mild heat treatment conditions, that is, under low temperature cure conditions.

Particularly, in a case in which it is wished to enhance durable water repellency, it is preferable that a textile product is subjected to water repellent processing by a method including the above-described step of treating the textile product with a treatment liquid including the water repellent agent composition; and a step of attaching a crosslinking agent, which is represented by a compound having one or more of methylolmelamine, an isocyanate group, or a blocked isocyanate group, to the textile product and heating this. Furthermore, in a case in which it is wished to further enhance durable water repellency, it is preferable that the water repellent agent composition includes a non-fluorinated polymer obtained by copolymerizing a monomer having a functional group that can react with the aforementioned crosslinking agent.

Examples of the compound having one or more isocyanate groups include monoisocyanates such as butyl isocyanate, phenyl isocyanate, tolyl isocyanate, naphthalene isocyanate; diisocyanates such as tolylene diisocyanate, diphenylmethane diisocyanate, tetramethylxylylene diisocyanate, and hydrogenated diphenylmethane diisocyanate; trimers, which are isocyanurate rings of these isocyanates, and trimethylolpropane adducts. Furthermore, examples of the compound having one or more blocked isocyanate groups include compounds obtained by protecting the isocyanate groups of the above-described compounds having isocyanate groups with a blocking agent. Examples of the blocking agent used at this time include organic blocking agents such as secondary or tertiary alcohols, active methylene compounds, phenols, oximes, and lactams; and bisulfites such as sodium bisulfite and potassium bisulfate.

The crosslinking agents described above may be used singly, or a plurality of kinds may be used in combination.

The crosslinking agent can be attached to an object to be treated by, for example, a method of immersing the object to be treated (textile product) in a treatment liquid obtained by dissolving the crosslinking agent in an organic solvent or emulsifying and dispersing the crosslinking agent in water, and drying the treatment liquid attached to the object to be treated. Then, a reaction between the crosslinking agent and the object to be treated as well as the non-fluorinated polymer can be implemented by heating the crosslinking agent attached to the object to be treated. In order to implement the reaction of the crosslinking agent sufficiently and to thereby enhance washing durability more effectively, the heating at this time may be carried out at 110° C. to 180° C. for 1 to 5 minutes. The processes of attaching and heating the crosslinking agent may be carried out simultaneously with the process of treating with a treatment liquid including the water repellent agent composition. In the case of performing the processes simultaneously, for example, a treatment liquid containing the water repellent agent composition and a crosslinking agent is attached to an object to be treated, water is removed, and then the crosslinking agent attached to the object to be treated is heated. In consideration of simplification of the water repellent processing process, reduction of the amount of heat, and economic efficiency, it is preferable to carry out the processes simultaneously with the water repellent agent composition treatment process.

Furthermore, if the crosslinking agent is used in excess, there is a risk that the texture may be impaired. It is preferable that the crosslinking agent is used in an amount of 0.1% to 50% by mass, and particularly preferably in an amount of 0.1% to 10% by mass, with respect to the object to be treated (textile product).

The water-repellent textile product of the present embodiment thus obtainable can exhibit sufficient water repellency even in the case of being used outdoors for a long time period, and since the water-repellent textile product does not use any fluorinated compound, the water-repellent textile product can be made environment-friendly.

The water-repellent textile product of the present embodiment can be subjected to coating processing at a predetermined part. Examples of the coating processing include moisture-permeable waterproof processing and windproof processing for sports applications and outdoors applications. Regarding the processing method, in the case of moisture-permeable waterproof processing, processing can be carried out by applying a coating liquid including a urethane resin, an acrylic resin or the like and a medium on one surface of a water repellent-treated textile product, and drying the coating liquid.

Thus, suitable embodiments of the present invention have been described; however, the present invention is not intended to be limited to the embodiments described above.

For example, in the case of producing a non-fluorinated polymer that is to be included in the water repellent agent composition of the present invention, the polymerization reaction is carried out by radical polymerization in the embodiments described above; however, the polymerization reaction may also be carried out by photopolymerization of irradiating with ionizing radiation such as ultraviolet radiation, an electron beam, or γ-radiation.

According to the present invention, a water-repellent textile product is obtained by treating a textile product with a water repellent agent composition; however, the product to be treated with a water repellent agent composition is not limited to textile product applications, and may also be articles made of a metal, glass, a resin, or the like.

In such a case, the method of attaching the water repellent agent composition to the aforementioned article or the amount of attachment of the water repellent agent can be determined arbitrarily according to the type of the object to be treated, or the like.

EXAMPLES

Hereinafter, the present invention will be described in more detail by way of Examples; however, the present invention is not intended to be limited by these Examples.
<Preparation of Polymer Dispersion Liquid>
Mixed liquids having the compositions indicated in Tables 1 to 6 (in the tables, the values represent (g)) were polymerized by the procedure described below, and thus polymer dispersion liquids were obtained.

Example 1

20 g of stearyl acrylate, 20 g of stearyl methacrylate, 20 g of vinyl chloride, 2 g of NOIGEN XL-100 (manufactured by Dai-Ichi Kogyo Seiyaku Co., Ltd., polyoxyalkylene branched decyl ether, HLB=14.7), 2 g of NOIGEN XL-60 (manufactured by Dai-Ichi Kogyo Seiyaku Co., Ltd., polyoxyalkylene branched decyl ether, HLB=12.5), 3 g of stearyldimethylamine hydrochloride, 25 g of tripropylene glycol, and 207.70 g of water were introduced into a 500-mL flask, and the mixture was mixed and stirred at 45° C. to obtain a mixed liquid. This mixed liquid was irradiated with ultrasonic waves, and all the monomers were emulsified and dispersed. Subsequently, 0.3 g of azobis(isobutylamidine) dihydrochloride was added to the mixed liquid, the mixed liquid was radical polymerized for 6 hours at 60° C. in a nitrogen atmosphere, and thus a non-fluorinated polymer dispersion liquid having a polymer concentration of 20% by mass was obtained.

Examples 2 to 24 and Comparative Examples 1 to 4

Polymerization was performed in the same manner as in Example 1, except that the materials described in Tables 1 to 6 were used, and non-fluorinated polymer dispersion liquids having the polymer concentrations indicated in Tables 7 to 10 were respectively obtained.

Meanwhile, it was confirmed by gas chromatography (GC-15APTF, manufactured by Shimadzu Corp.) that the various polymers in the polymer dispersion liquids obtained in Examples 1 to 24 and Comparative Examples 1 to 4 were such that 98% or more of all the monomers were polymerized in all cases.

The details of the materials indicated in Tables 1 to 6 are as follows.
LATEMUL PD-420 (manufactured by Kao Corp., polyoxyalkylene alkenyl ether, HLB=12.6)
LATEMUL PD-430 (manufactured by Kao Corp., polyoxyalkylene alkenyl ether, HLB=14.4)
Ethylene oxide 12.5 mol adduct of cardanol (HLB=12.9; in the table, indicated as "Cardanol 12.5 EO")
Ethylene oxide 8.3 mol adduct of cardanol (HLB=11.0; in the table, indicated as "Cardanol 8.3 EO")
Ethylene oxide 42 mol adduct of castor oil (HILB=13.3; in the table, indicated as "Castor oil 42 EO")
Ethylene oxide 30 mol adduct of castor oil (HLB=11.7; in the table, indicated as "Castor oil 30 EO")

"C8 fluoro group-containing acrylate" in the table is a mixture represented by the following General Formula (III):

$$C_nF_{2n+1}CH_2CH_2OCOCH=CH_2 \quad (III)$$

with the average value of n being 8 (meanwhile, in this mixture, compounds with n=6, 8, 10, 12, and 14 are mixed).

Evaluations were performed for the polymer dispersion liquids obtained as described above and the polymers obtained by the methods described below.

(Evaluation of Physical Properties of Polymer)

500 mL of acetone was added to 50 g of each of the polymer dispersion liquids obtained in Examples 1 to 24 and Comparative Examples 1 to 4, and thereby the polymer and the emulsifier were separated. The polymer was collected by filtration, and this polymer was dried under reduced pressure for 24 hours at 25° C. The polymer thus obtained was evaluated as follows. The results are presented in Tables 7 to 10.

(1) Method for Measuring Melt Viscosity

For each of the polymers of Examples and Comparative Examples obtained as described above, the melt viscosity at 105° C. was measured using an elevated type flow tester CFT-500 (manufactured by Shimadzu Corp.), by introducing 1 g of the polymer into a cylinder equipped with a die (length 10 mm, diameter 1 mm), maintaining the polymer at 105° C. for 6 minutes, and measuring the viscosity while applying a load of 100 kg·f/cm$^2$ by means of a plunger.

(2) Method for Measuring Weight Average Molecular Weight

For each of the polymers of Examples and Comparative Examples obtained as described above, measurement was made by means of a GPC apparatus (GPC "HLC-8020" manufactured by Tosoh Corp.) under the conditions of a column temperature of 40° C. and a flow rate of 1.0 ml/min, using tetrahydrofuran as the eluent, and the weight average molecular weight was measured relative to polystyrene standards. Meanwhile, regarding the column, three columns under trade name TSK-GEL G5000HHR, G4000HHR, and G3000HHR manufactured by Tosoh Corp. were connected and mounted.

(Evaluation of Storage Stability of Water Repellent Agent Composition)

The stability at the time of storing the polymer dispersions obtained in Examples and Comparative Examples at 45° C. for two weeks was evaluated by the following criteria. The results are presented in Tables 7 to 10.

A: There is no change in the external appearance.

B: An oily material is slightly recognized in the vicinity of the liquid surface, and a polymer precipitate is slightly recognized on the container wall surface.

C: Sediment of the polymer, separation and gelation are recognized.

(Evaluation of Water Repellency of Textile Product)

A test was performed according to the spray method of JIS L 1092 (1998) at a shower water temperature of 27° C. In the present test, a 100% polyester fabric or 100% nylon fabric that had been dyed was subjected to an immersion treatment (pickup rate 60% by mass) in a treatment liquid obtained by diluting each of the polymer dispersion liquids of Examples and Comparative Examples with water such that the polymer content would be 3% by mass, and subsequently the fabric was dried for 2 minutes at 130° C. The fabric was further heat-treated under the conditions indicated in Tables 7 to 10, and thus water repellency of the fabric thus obtained was evaluated. The results were evaluated by the following criteria by visual inspection. In a case in which the characteristics were slightly satisfactory, the symbol "+" was affixed to the grade, and in a case in which the characteristics were slightly inferior, the symbol "−" was affixed to the grade. The results are presented in Tables 7 to 10.

Water repellency: state

5: There is no moisture adhering to the surface.

4: There is slight moisture adhering to the surface.

3: The surface shows partial wetting.

2: The surface shows wetting.

1: The entire surface shows wetting.

0: Both the front surface and the back surface show complete wetting.

(Evaluation of Texture of Textile Product)

The texture was evaluated using a 100% polyester fabric that had been dyed, which was subjected to an immersion treatment (pickup rate 60% by mass) in a treatment liquid obtained by diluting each of the polymer dispersion liquids of Examples and Comparative Examples with water such that the polymer content would be 3% by mass, subsequently dried for 2 minutes at 130° C., and heat-treated for 30 seconds at 170° C. The results were evaluated according to the following five grades on the basis of handling. The results are presented in Tables 7 to 10.

1: Hard~5: Soft (Evaluation of Durable Water Repellency of Textile Product)

A test was carried out according to the spraying method of JIS L 1092 (1998) at a shower water temperature of 27° C. In the present test, the water repellency of a fabric (L-0) obtained by subjecting a 100% polyester fabric that had been dyed, to an immersion treatment (pickup rate 60% by mass) in a treatment liquid obtained by diluting each of the polymer dispersion liquids of Examples and Comparative Examples and each of chemical agents with water such that the content of the polymer would be 3% by mass, the content of UNIKA RESIN 380-K (crosslinking agent, manufactured by Union Chemical Industry Co., Ltd., trimethylolmelamine resin) would be 0.3% by mass, and the content of UNIKA CATALYST 3-P (surfactant, manufactured by Union Chemical Industry Co., Ltd., aminoalcohol hydrochloride) would be 0.2% by mass, subsequently drying the fabric for 2 minutes at 130° C., and heat-treating the fabric for 60 seconds at 170° C.; and the water repellency of a fabric (L-10) obtained after performing washing according to the 103 method of JIS L 0217 (1995) for 10 times were evaluated in the same manner as in the water repellency evaluation method described above. Furthermore, in the case of 100% nylon fabric, too, evaluation was performed in the same manner as in the case of the 100% polyester fabric, except that the heat treatment temperature was changed from 170° C. to 160° C. The results are presented in Tables 7 to 10.

(Peeling Strength with Respect to Coating of Textile Product)

A test was carried out according to JIS K 6404-5 (1999). In the present test, a 100% nylon fabric that had been dyed, which was obtained by subjecting the fabric to an immersion treatment (pickup rate 60% by mass) in a treatment liquid obtained by diluting each of the polymer dispersion liquids of Examples and Comparative Examples with water such that the polymer content was 3% by mass, subsequently drying the fabric for 2 minutes at 130° C., and heat-treating the fabric for 30 seconds at 160° C., was used as a base fabric. A hot melt adhesive tape ("MELCO tape" manufactured by San Chemicals, Ltd.) was thermally adhered to the base fabric thus obtained for 1 minute at 150° C. using a thermocompression bonding apparatus, and the interlayer peeling strength between the base fabric and the seam tape was measured with an AUTOGRAPH (AG-IS, manufactured by Shimadzu Corp.). The base fabric and the tape were pulled at a movement speed of the clamping jaws of 100 mm/min, and the average value of stress was designated as the peeling strength [N/inch]. The results are presented in Tables 7 to 10.

TABLE 1

| | Material | Example 1 | Example 2 | Example 3 | Example 4 | Example 5 |
|---|---|---|---|---|---|---|
| Monomer (A) | Stearyl acrylate | 20 | 40 | 40 | 40 | 40 |
| | Lauryl acrylate | — | — | — | — | — |
| | Behenyl acrylate | — | — | — | — | — |
| | C8 fluoro group-containing acrylate | — | — | — | — | — |
| | Stearyl methacrylate | 20 | — | — | — | — |
| | Lauryl methacrylate | — | — | — | — | — |
| Monomer (E) | Vinyl chloride | 20 | 20 | — | 20 | 20 |
| | Vinylidene chloride | — | — | 20 | — | — |
| Reactive emulsifier (B) | LATEMUL PD-430 | — | 2 | 2 | 2 | 2 |
| | LATEMUL PD-420 | — | 2 | 2 | 2 | 2 |
| | Cardanol 12.5 EO | — | — | — | — | — |
| | Cardanol 8.3 EO | — | — | — | — | — |
| | Castor oil 42 EO | — | — | — | — | — |
| | Castor oil 30 EO | — | — | — | — | — |
| Other emulsifier | NOIGEN XL-100 | 2 | — | — | — | — |
| | NOIGEN XL-60 | 2 | — | — | — | — |
| Monomer (C2) | Isobornyl methacrylate | — | — | — | — | — |
| Monomer (C3) | Methyl methacrylate | — | — | — | — | — |
| Monomer (C4) | Ethoxylated isocyanuric acid triacrylate | — | — | — | — | — |
| Monomer (D) | Acryloylmorpholine | — | — | — | — | — |
| Emulsification aid | Stearyldimethylamine hydrochloride | 3 | 3 | 3 | 3 | 3 |
| Medium (organic solvent) | Tripropylene glycol | 25 | 25 | 25 | 25 | 25 |
| Chain transfer agent | Dodecylmercaptan | — | — | — | 0.05 | 0.15 |
| Medium | Water | 207.70 | 207.70 | 207.70 | 207.65 | 207.55 |
| Initiator | Azobis(isobutylamidine) dihydrochloride | 0.3 | 0.3 | 0.3 | 0.3 | 0.3 |
| | Total | 300 | 300 | 300 | 300 | 300 |

TABLE 2

| | Material | Example 6 | Example 7 | Example 8 | Example 9 | Example 10 |
|---|---|---|---|---|---|---|
| Monomer (A) | Stearyl acrylate | 40 | — | — | — | — |
| | Lauryl acrylate | — | 40 | — | — | — |
| | Behenyl acrylate | — | — | 40 | — | — |
| | C8 fluoro group-containing acrylate | — | — | — | — | — |
| | Stearyl methacrylate | — | — | — | 40 | — |
| | Lauryl methacrylate | — | — | — | — | 40 |
| Monomer (E) | Vinyl chloride | 20 | 20 | 20 | 20 | 20 |
| | Vinylidene chloride | — | — | — | — | — |
| Reactive emulsifier (B) | LATEMUL PD-430 | 2 | 2 | 2 | 2 | 2 |
| | LATEMUL PD-420 | 2 | 2 | 2 | 2 | 2 |
| | Cardanol 12.5 EO | — | — | — | — | — |
| | Cardanol 8.3 EO | — | — | — | — | — |
| | Castor oil 42 EO | — | — | — | — | — |
| | Castor oil 30 EO | — | — | — | — | — |
| Other emulsifier | NOIGEN XL-100 | — | — | — | — | — |
| | NOIGEN XL-60 | — | — | — | — | — |
| Monomer (C2) | Isobornyl methacrylate | — | — | — | — | — |
| Monomer (C3) | Methyl methacrylate | — | — | — | — | — |
| Monomer (C4) | Ethoxylated isocyanuric acid triacrylate | — | — | — | — | — |
| Monomer (D) | Acryloylmorpholine | — | — | — | — | — |
| Emulsification aid | Stearyldimethylamine hydrochloride | 3 | 3 | 3 | 3 | 3 |
| Medium (organic solvent) | Tripropylene glycol | 25 | 25 | 25 | 25 | 25 |
| Chain transfer agent | Dodecylmercaptan | 0.30 | — | — | — | — |
| Medium | Water | 207.40 | 207.70 | 207.70 | 207.70 | 207.70 |
| Initiator | Azobis(isobutylamidine) dihydrochloride | 0.3 | 0.3 | 0.3 | 0.3 | 0.3 |
| | Total | 300 | 300 | 300 | 300 | 300 |

TABLE 3

| | Material | Example 11 | Example 12 | Example 13 | Example 14 | Example 15 |
|---|---|---|---|---|---|---|
| Monomer (A) | Stearyl acrylate | 20 | 30 | 30 | 30 | 30 |
| | Lauryl acrylate | — | — | — | — | — |
| | Behenyl acrylate | — | — | — | — | — |
| | C8 fluoro group-containing acrylate | — | — | — | — | — |
| | Stearyl methacrylate | 20 | 10 | 10 | 10 | 1 |
| | Lauryl methacrylate | — | — | — | — | — |
| Monomer (E) | Vinyl chloride | 20 | 20 | 20 | 20 | 20 |
| | Vinylidene chloride | — | — | — | — | — |
| Reactive emulsifier (B) | LATEMUL PD-430 | 2 | 2 | — | — | 1 |
| | LATEMUL PD-420 | 2 | 2 | — | — | 1 |
| | Cardanol 12.5 EO | — | — | 2 | — | — |
| | Cardanol 8.3 EO | — | — | 2 | — | — |
| | Castor oil 42 EO | — | — | — | 2 | — |
| | Castor oil 30 EO | — | — | — | 2 | — |
| Other emulsifier | NOIGEN XL-100 | — | — | — | — | 1 |
| | NOIGEN XL-60 | — | — | — | — | 1 |
| Monomer (C2) | Isobornyl methacrylate | — | — | — | — | — |
| Monomer (C3) | Methyl methacrylate | — | — | — | — | — |
| Monomer (C4) | Ethoxylated isocyanuric acid triacrylate | — | — | — | — | — |
| Monomer (D) | Acryloylmorpholine | — | — | — | — | — |
| Emulsification aid | Stearyldimethylamine hydrochloride | 3 | 3 | 3 | 3 | 3 |
| Medium (organic solvent) | Tripropylene glycol | 25 | 25 | 25 | 25 | 25 |
| Chain transfer agent | Dodecylmercaptan | — | — | — | — | — |
| Medium | Water | 207.70 | 207.70 | 207.70 | 207.70 | 207.70 |
| Initiator | Azobis(isobutylamidine) dihydrochloride | 0.3 | 0.3 | 0.3 | 0.3 | 60.3 |
| | Total | 300 | 300 | 300 | 300 | 300 |

TABLE 4

| | Material | Example 16 | Example 17 | Example 18 | Example 19 | Example 20 |
|---|---|---|---|---|---|---|
| Monomer (A) | Stearyl acrylate | 30 | 15 | 35 | 15 | 8 |
| | Lauryl acrylate | — | — | — | — | — |
| | Behenyl acrylate | — | — | — | — | — |
| | C8 fluoro group-containing acrylate | — | — | — | — | — |
| | Stearyl methacrylate | 20 | 10 | 5 | 25 | 32 |
| | Lauryl methacrylate | — | — | — | — | — |
| Monomer (E) | Vinyl chloride | 10 | 25 | 20 | 20 | 20 |
| | Vinylidene chloride | — | — | — | — | — |
| Reactive emulsifier (B) | LATEMUL PD-430 | 1 | 1 | 1 | 1 | 1 |
| | LATEMUL PD-420 | 1 | 1 | 1 | 1 | 1 |
| | Cardanol 12.5 EO | — | — | — | — | — |
| | Cardanol 8.3 EO | — | — | — | — | — |
| | Castor oil 42 EO | — | — | — | — | — |
| | Castor oil 30 EO | — | — | — | — | — |
| Other emulsifier | NOIGEN XL-100 | 1 | 1 | 1 | 1 | 1 |
| | NOIGEN XL-60 | 1 | 1 | 1 | 1 | 1 |
| Monomer (C2) | Isobornyl methacrylate | — | — | — | — | — |
| Monomer (C3) | Methyl methacrylate | — | — | — | — | — |
| Monomer (C4) | Ethoxylated isocyanuric acid triacrylate | — | — | — | — | — |
| Monomer (D) | Acryloylmorpholine | — | — | — | — | — |
| Emulsification aid | Stearyldimethylamine hydrochloride | 3 | 3 | 3 | 3 | 3 |
| Medium (organic solvent) | Tripropylene glycol | 25 | 25 | 25 | 25 | 25 |
| Chain transfer agent | Dodecylmercaptan | — | — | — | — | — |
| Medium | Water | 207.70 | 217.70 | 207.70 | 207.70 | 207.70 |
| Initiator | Asobis(isobutylamidine) dihydrochloride | 0.3 | 0.3 | 0.3 | 0.3 | 0.3 |
| | Total | 300 | 300 | 300 | 300 | 300 |

TABLE 5

| | Material | Example 21 | Example 22 | Example 23 | Example 24 |
|---|---|---|---|---|---|
| Monomer (A) | Stearyl acrylate | 20 | 20 | 20 | 20 |
| | Lauryl acrylate | — | — | — | — |
| | Behenyl acrylate | — | — | — | — |
| | C8 fluoro group-containing acrylate | — | — | — | — |
| | Stearyl methacrylate | 20 | 20 | 20 | 20 |
| | Lauryl methacrylate | — | — | — | — |

TABLE 5-continued

| | Material | Example 21 | Example 22 | Example 23 | Example 24 |
|---|---|---|---|---|---|
| Monomer (E) | Vinyl chloride | 20 | 20 | 20 | 20 |
| | Vinylidene chloride | — | — | — | — |
| Reactive emulsifier (B) | LATEMUL PD-430 | 1 | 1 | 1 | 1 |
| | LATEMUL PD-420 | 1 | 1 | 1 | 1 |
| | Cardanol 12.5 EO | — | — | — | — |
| | Cardanol 8.3 EO | — | — | — | — |
| | Castor oil 42 EO | — | — | — | — |
| | Castor oil 30 EO | — | — | — | — |
| Other emulsifier | NOIGEN XL-100 | 1 | 1 | 1 | 1 |
| | NOIGEN XL-60 | 1 | 1 | 1 | 1 |
| Monomer (C2) | Isobornyl methacrylate | 5 | — | — | — |
| Monomer (C3) | Methyl methacrylate | — | 5 | — | — |
| Monomer (C4) | Ethoxylated isocyanuric acid triacrylate | — | — | 5 | — |
| Monomer (D) | Acryloylmorpholine | — | — | — | 5 |
| Emulsification aid | Stearyldimethylamine hydrochloride | 3 | 3 | 3 | 3 |
| Medium (organic solvent) | Tripylene glycol | 25 | 25 | 25 | 25 |
| Chain transfer agent | Dodecylmercaptan | — | — | — | — |
| Medium | Water | 202.70 | 202.70 | 202.70 | 202.70 |
| Initiator | Azobis(isobutylamidine) dihydrochloride | 0.3 | 0.3 | 0.3 | 0.3 |
| | Total | 300 | 300 | 300 | 300 |

TABLE 6

| | Material | Comparative Example 1 | Comparative Example 2 | Comparative Example 3 | Comparative Example 4 |
|---|---|---|---|---|---|
| Monomer (A) | Stearyl acrylate | — | 60 | 60 | — |
| | Lauryl acrylate | — | — | — | — |
| | Behenyl acrylate | — | — | — | — |
| | C8 fluoro group-containing acrylate | 60 | — | — | — |
| | Stearyl methacrylate | — | — | — | — |
| | Lauryl methacrylate | — | — | — | — |
| Monomer (E) | Vinyl chloride | — | — | — | 60 |
| | Vinylidene chloride | — | — | — | — |
| Reactive emulsifier (B) | LATEMUL PD-430 | — | — | 2 | 2 |
| | LATEMUL PD-420 | — | — | 2 | 2 |
| | Cardanol 12.5 EO | — | — | — | — |
| | Cardanol 8.3 EO | — | — | — | — |
| | Castor oil 42 EO | — | — | — | — |
| | Castor oil 30 EO | — | — | — | — |
| Other emulsifier | NOIGEN XL-100 | 2 | 2 | — | — |
| | NOIGEN XL-60 | 2 | 2 | — | — |
| Monomer (C2) | Isobornyl methacrylate | — | — | — | — |
| Monomer (C3) | Methyl methacrylate | — | — | — | — |
| Monomer (C4) | Ethoxylated isocyanuric acid triacrylate | — | — | — | — |
| Monomer (D) | Acryloylmorpholine | — | — | — | — |
| Emulsification aid | Stearyldimethylamine hydrochloride | 3 | 3 | 3 | 3 |
| Medium (organic solvent) | Tripylene glycol | 25 | 25 | 25 | 25 |
| Chain transfer agent | Dodecylmercaptan | — | — | — | — |
| Medium | Water | 207.70 | 207.70 | 207.70 | 207.70 |
| Initiator | Azobis(isobutylamidine) dihydrochloride | 0.3 | 0.3 | 0.3 | 0.3 |
| | Total | 300 | 300 | 300 | 300 |

TABLE 7

| | | Example 1 | Example 2 | Example 3 | Example 4 | Example 5 | Example 6 | Example 7 | Example 8 |
|---|---|---|---|---|---|---|---|---|---|
| | Polymer concentration (%) | 20 | 21 | 21 | 21 | 21 | 21 | 21 | 21 |
| Polymer physical properties | 105° C. melt viscosity (pa · s) | 70 | 70 | 70 | 70 | <50 | <50 | 70 | 70 |
| | Weight average molecular weight | 600,000 | 600,000 | 600,000 | 500,000 | 200,000 | 50,000 | 600,000 | 600,000 |
| | Storage stability of composition | A | A | A | A | A | A | A | A |
| Water repellency (polyester) | Without heat treatment | 5 | 5 | 5 | 5 | 5 | 5 | 4 | 5 |
| | 170° C. × 1 min | 5 | 5 | 5 | 5 | 5 | 5 | 4 | 5 |
| Water repellency (nylon) | Without heat treatment | 5 | 4 | 4 | 4 | 4 | 4 | 4 | 4 |
| | 160° C. × 1 min | 5 | 4 | 4 | 4 | 4 | 4 | 4 | 4 |
| | Texture (polyester) | 4 | 4 | 4 | 4 | 4 | 4 | 4 | 4 |

TABLE 7-continued

|  |  | Example 1 | Example 2 | Example 3 | Example 4 | Example 5 | Example 6 | Example 7 | Example 8 |
|---|---|---|---|---|---|---|---|---|---|
| Durable water repellency (polyester) | Washing 0 times (L-0) | 5 | 5 | 5 | 5 | 5 | 5 | 4 | 5 |
|  | Washing 10 times (L-10) | 3 | 2 | 2 | 2 | 2 | 1 | 2 | 2 |
| Durable water repellency (nylon) | Washing 0 times (L-0) | 5 | 4 | 4 | 4 | 4 | 4 | 4 | 4 |
|  | Washing 10 times (L-10) | 2 | 2 | 1 | 2 | 2 | 1 | 1 | 2 |
|  | Peeling strength (N/inch) | 9 | 13 | 11 | 12 | 10.5 | 9.5 | 11 | 11.5 |

TABLE 8

|  |  | Example 9 | Example 10 | Example 11 | Example 12 | Example 13 | Example 14 | Example 15 | Example 16 |
|---|---|---|---|---|---|---|---|---|---|
|  | Polymer concentration (%) | 21 | 21 | 21 | 21 | 21 | 21 | 21 | 21 |
| Polymer physical properties | 105° C. melt viscosity (pa·s) | 70 | 70 | 70 | 70 | 70 | 200 | 70 | 70 |
|  | Weight average molecular weight | 600,000 | 600,000 | 600,000 | 600,000 | 600,000 | >1,000,000 | 600,000 | 600,000 |
|  | Storage stability of composition | A | A | A | A | A | A | A | A |
| Water repellency (polyester) | Without heat treatment | 4 | 4 | 5 | 5 | 5 | 5 | 5 | 5 |
|  | 170° C. × 1 min | 4 | 4 | 5 | 5 | 5 | 5 | 5 | 5 |
| Water repellency (nylon) | Without heat treatment | 4 | 4 | 5 | 5 | 4 | 4 | 5 | 5 |
|  | 160° C. × 1 min | 4 | 4 | 5 | 5 | 4 | 4 | 5 | 5 |
|  | Texture (polyester) | 4 | 4 | 4 | 4 | 4 | 4 | 4 | 4 |
| Durable water repellency (polyester) | Washing 0 times (L-0) | 4 | 4 | 5 | 5 | 5 | 5 | 5 | 5 |
|  | Washing 10 times (L-10) | 2 | 1 | 3 | 4 | 3 | 3+ | 4 | 3 |
| Durable water repellency (nylon) | Washing 0 times (L-0) | 4 | 4 | 5 | 5 | 4 | 4 | 5 | 5 |
|  | Washing 10 times (L-10) | 2 | 1 | 3 | 4 | 2 | 3 | 4 | 3 |
|  | Peeling strength (N/inch) | 12 | 11 | 12 | 12 | 11 | 11.5 | 13 | 11.5 |

TABLE 9

|  |  | Example 17 | Example 18 | Example 19 | Example 20 | Example 21 | Example 22 | Example 23 | Example 24 |
|---|---|---|---|---|---|---|---|---|---|
|  | Polymer concentration (%) | 17 | 21 | 21 | 21 | 22 | 22 | 22 | 22 |
| Polymer physical properties | 105° C. melt viscosity (pa·s) | 70 | 70 | 70 | 70 | 70 | 70 | 80 | 70 |
|  | Weight average molecular weight | 600,000 | 600,000 | 600,000 | 600,000 | 600,000 | 600,000 | >1,000,000 | 600,000 |
|  | Storage stability of composition | B | A | A | A | A | A | A | A |
| Water repellency (polyester) | Without heat treatment | 5 | 5 | 5 | 5 | 5 | 5 | 5 | 5 |
|  | 170° C. × 1 min | 5 | 5 | 5 | 5 | 5 | 5 | 5 | 5 |
| Water repellency (nylon) | Without heat treatment | 5 | 5 | 5 | 5 | 5 | 5 | 5 | 5 |
|  | 160° C. × 1 min | 5 | 5 | 5 | 5 | 5 | 5 | 5 | 5 |
|  | Texture (polyester) | 4 | 4 | 4 | 4 | 4 | 4 | 3 | 4 |
| Durable water repellency (polyester) | Washing 0 times (L-0) | 5 | 5 | 5 | 5 | 5 | 5 | 5 | 5 |
|  | Washing 10 times (L-10) | 4 | 4 | 3 | 3 | 4 | 4 | 4 | 4 |
| Durable water repellency (nylon) | Washing 0 times (L-0) | 5 | 5 | 5 | 5 | 5 | 5 | 5 | 3 |
|  | Washing 10 times (L-10) | 4 | 3 | 3 | 2 | 3 | 4 | 4 | 3 |
|  | Peeling strength (N/inch) | 14 | 12.5 | 14 | 14.5 | 13.5 | 14 | 15.5 | 16 |

TABLE 10

|  |  | Comparative Example 1 | Comparative Example 2 | Comparative Example 3 | Comparative Example 4 |
|---|---|---|---|---|---|
|  | Polymer concentration (%) | 20 | 20 | 21 | 21 |
| Polymer physical properties | 105° C. melt viscosity (pa·s) | — | 70 | 70 | 70 |
|  | Weight average molecular weight | — | 600,000 | 600,000 | 600,000 |
|  | Storage stability of composition | A | A | A | C |
| Water repellency (polyester) | Without heat treatment | 4- | 4 | 5 | 1 |
|  | 170° C. × 1 min | 5 | 4 | 5 | 1 |

TABLE 10-continued

|  |  | Comparative Example 1 | Comparative Example 2 | Comparative Example 3 | Comparative Example 4 |
|---|---|---|---|---|---|
| Water repellency(nylon) | Without heat treatment | 3- | 4 | 4 | 1 |
|  | 160° C. × 1 min | 4 | 4 | 4 | 1 |
| Texture (polyester) |  | 3 | 4 | 4 | 4 |
| Durable water repellency (polyester) | Washing 0 times (L-0) | 5 | 4 | 5 | 1 |
|  | Washing 10 times (L-10) | 2 | 3 | 2 | 1 |
| Durable water repellency (nylon) | Washing 0 times (L-0) | 4 | 4 | 4 | 1 |
|  | Washing 10 times (L-10) | 1 | 2 | 1 | 1 |
| Peeling strength (N/inch) |  | 13 | 2 | 3 | 11 |

It was confirmed that the textile products treated with the water repellent agent compositions of Examples 1 to 24 exhibited water repellency and durable water repellency that were equivalent or superior to the case of using a conventional fluorinated water repellent agent (Comparative Example 1), even in a case in which the textile products were not heat-treated, and also exhibited satisfactory texture. Furthermore, it was confirmed that the storage stability of the composition was also satisfactory.

Furthermore, it was confirmed that the textile products treated with the water repellent agent compositions of Examples 1 to 24 had superior peeling strength with respect to a coating, compared to the cases of using the non-fluorinated water repellent agent compositions that did not include component (E) of Comparative Examples 2 and 3.

When a comparison was made between Example 2 and Examples 4 to 6, it was confirmed that even if the compositions of the non-fluorinated polymers were close, when the weight average molecular weights of the polymers were different, a polymer having a larger weight average molecular weight exhibited superior water repellency.

The water repellent agent composition of Comparative Example 2 was a non-fluorinated polymer composed only of component (A), and compared to the water repellent agent composition of Example 1, since the water repellent agent composition of Comparative Example 2 did not include component (E), the water repellent agent composition tended to have inferior peeling strength with respect to a coating. The water repellent agent composition of Comparative Example 3 was a non-fluorinated polymer composed of component (A) and component (B), and since the water repellent agent composition included component (B), the water repellent agent composition exhibited enhanced water repellency of the textile product thus obtainable. However, the water repellent agent composition did not include component (E), the water repellent agent composition tended to have inferior peeling strength with respect to a coating. The water repellent agent composition of Comparative Example 4 did not include component (A), and it was confirmed that the water repellency of the textile product thus obtainable deteriorated per se. Furthermore, since the proportion of component (E) was too high, the storage stability tended to deteriorate significantly.

The invention claimed is:

1. A non-fluorinated polymer, comprising:
   a constituent unit derived from a (meth)acrylic acid ester monomer (A) of General Formula (A-1);
   a constituent unit derived from at least one monomer (E) from between vinyl chloride and vinylidene chloride; and
   a constituent unit derived from at least one reactive emulsifier (B) selected from
   (B1) a compound of General Formula (I-1) and having a HLB of 7 to 18;
   (B2) a compound of General Formula (II-1) and having a HLB of 7 to 18; and
   (B3) a compound having a HLB of 7 to 18 and obtained by adding an alkylene oxide having 2 to 4 carbon atoms to an oil or fat having a hydroxyl group and a polymerizable unsaturated group:

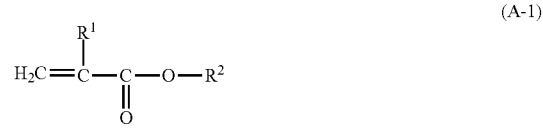

(A-1)

wherein in Formula (A-1), $R^1$ is a hydrogen or a methyl group; and $R^2$ is a monovalent hydrocarbon group having 12 or more carbon atoms which may have a substituent;

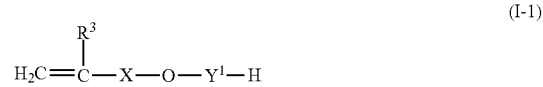

(I-1)

wherein in Formula (I-1), $R^3$ is a hydrogen or a methyl group; X is a linear or branched alkylene group having 1 to 6 carbon atoms; and $Y^1$ is a divalent group including an alkyleneoxy group having 2 to 4 carbon atoms; and

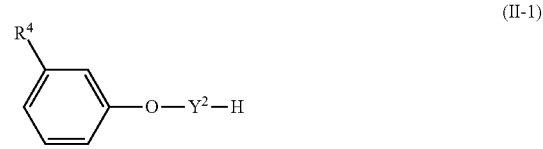

(II-1)

wherein in Formula (II-1), $R^4$ is a monovalent unsaturated hydrocarbon group having 13 to 17 carbon atoms and having a polymerizable unsaturated group; and $Y^2$ is a divalent group including an alkyleneoxy group having 2 to 4 carbon atoms.

2. A non-fluorinated polymer formed by subjecting an emulsion or dispersion comprising:
   a (meth)acrylic acid ester monomer (A) of General Formula (A-1);
   at least one monomer (E) selected from between vinyl chloride and vinylidene chloride; and
   at least one reactive emulsifier (B) selected from
   (B1) a compound of General Formula (I-1) and having a HLB of 7 to 18;

(B2) a compound of General Formula (II-1) and having a HLB of 7 to 18; and
(B3) a compound having a HLB of 7 to 18 and obtained by adding an alkylene oxide having 2 to 4 carbon atoms to an oil or fat having a hydroxyl group and a polymerizable unsaturated group
to emulsion polymerization or dispersion polymerization:

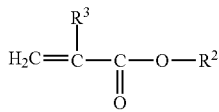
(A-1)

wherein in Formula (A-1), $R^1$ is a hydrogen or a methyl group; and $R^2$ is a monovalent hydrocarbon group having 12 or more carbon atoms which may have a substituent,

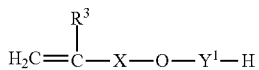
(I-1)

wherein in Formula (I-1), $R^3$ is a hydrogen or a methyl group; X is a linear or branched alkylene group having 1 to 6 carbon atoms; and $Y^1$ is a divalent group including an alkyleneoxy group having 2 to 4 carbon atoms, and

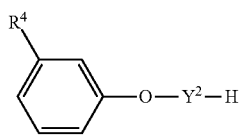
(II-1)

wherein in Formula (II-1), $R^4$ is a monovalent unsaturated hydrocarbon group having 13 to 17 carbon atoms and having a polymerizable unsaturated group; and $Y^2$ is a divalent group including an alkylene group having 2 to 4 carbon atoms.

3. The non-fluorinated polymer according to claim 1, wherein the (meth)acrylic acid ester monomer (A) includes an acrylic acid ester monomer (a1) and a methacrylic acid ester monomer (a2), and
the ratio (a1)/(a2) of the mass of the acrylic acid ester monomer (a1) and the mass of the methacrylic acid ester monomer (a2) included in the (meth)acrylic acid ester monomer (A) is 30/70 to 90/10.

4. A water repellent agent composition comprising the non-fluorinated polymer according to claim 1.

5. A water-repellent textile product consisting of a textile product having the non-fluorinated polymer according to claim 1.

6. A method for producing a water-repellent textile product, the method comprising a step of treating a textile product with a treatment liquid including the water repellent agent composition according to claim 4.

7. The non-fluorinated polymer according to claim 2, wherein the (meth)acrylic acid ester monomer (A) includes an acrylic acid ester monomer (a1) and a methacrylic acid ester monomer (a2), and
the ratio (a1)/(a2) of the mass of the acrylic acid ester monomer (a1) and the mass of the methacrylic acid ester monomer (a2) included in the (meth)acrylic acid ester monomer (A) is 30/70 to 90/10.

8. A water repellent agent composition comprising the non-fluorinated polymer according to claim 2.

9. A water-repellent textile product consisting of a textile product having the non-fluorinated polymer according to claim 2.

10. A method for producing a water-repellent textile product, the method comprising a step of treating a textile product with a treatment liquid including the water repellent agent composition according to claim 8.

11. The non-fluorinated polymer according to claim 1, wherein the compositional proportion of the monomer of component (B) in the non-fluorinated polymer is 0.5% to 20% by mass.

12. The non-fluorinated polymer according to claim 1, wherein $R^3$ in General Formula (I-1) is a methyl group.

13. The non-fluorinated polymer according to claim 1, wherein X in General Formula (I-1) is a linear alkylene group having 2 or 3 carbon atoms.

14. The non-fluorinated polymer according to claim 2, wherein the compositional proportion of the monomer of component (B) in the non-fluorinated polymer is 0.5% to 20% by mass.

15. The non-fluorinated polymer according to claim 2, wherein $R^3$ in General Formula (I-1) is a methyl group.

16. The non-fluorinated polymer according to claim 2, wherein X in General Formula (I-1) is a linear alkylene group having 2 or 3 carbon atoms.

* * * * *